Figure 1:
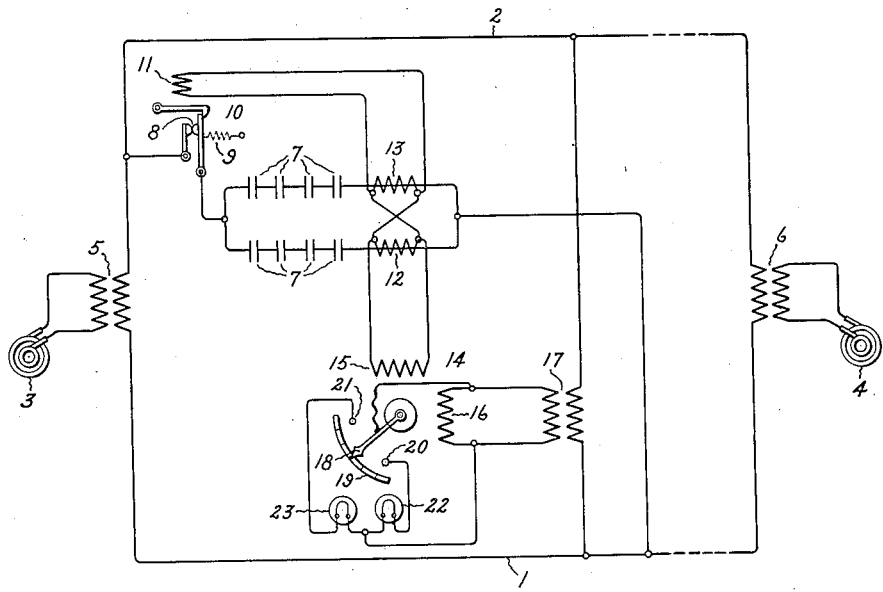

Sept. 11, 1934.   T. A. E. BELT   1,973,520
PROTECTIVE SYSTEM FOR ELECTRICAL APPARATUS
Filed Oct. 25, 1930

Inventor:
Thomas A. E. Belt
by Charles E. Tullar
His Attorney.

Patented Sept. 11, 1934

1,973,520

UNITED STATES PATENT OFFICE 1,973,520

PROTECTIVE SYSTEM FOR ELECTRICAL APPARATUS

Thomas A. E. Belt, Schenectady, N. Y., assignor to General Electric Company, a corporation of New York Application October 25, 1930, Serial No. 491,297

3 Claims. (Cl. 177—311)

My invention relates to protective systems for electrical apparatus and more particularly to improvements in systems for indicating, and protecting against, the di-electric failure of electric condensers which are associated with electric circuits.

Although it will become apparent to those skilled in the art, as the description of my invention proceeds, that my invention is not limited in application to electric condensers and may be applied to various types of impedance units, yet the problem which this invention solves arose in alternating current electrical distribution systems of the type including electrical condensers and consequently my invention will be described in connection with such systems.

The use of electrical condensers in electrical distribution systems is becoming increasingly common and promises to become very widespread in the future. These condensers are connected either as parallel capacitors across the distribution or transmission circuit or as series capacitors in the distribution or transmission circuit. Parallel capacitors are used to improve the power factor of systems because they act to neutralize the quadrature lagging component of the usual inductive load. Series capacitors are used to improve the inherent voltage regulation of distribution and transmission circuits. Thus by inserting sufficient series capacitance the circuit inductive reactance may be neutralized so that only the resistance of the circuit is a factor in reducing the load voltage. By over neutralizing the line reactance or in other words by making the line actually capacitive the resistance drop may be largely compensated for so as to secure a substantially flat inherent voltage regulation of the system or circuit over a reasonable range of load change. This latter feature will be readily understood when it is remembered that most commercial electrical loads are inductive and they thus draw a lagging current through the capacitive line with the result that an actual increase in voltage between source and load may be obtained. Another advantage of series capacitors is that they reduce the effective impedance of the circuit in which they are connected and thus act to increase the power limits of synchronous-to-synchronous systems for the power limit of such systems is a function of the impedance between the synchronous machines.

The electrical condensers which are used in the above mentioned systems are usually provided with a dielectric which is subject to permanent breakdown after it has once been ruptured or punctured. It is therefore necessary to provide such condensers with auxiliary equipment for taking them out of service in the event of failure of their dielectric material. With parallel capacitors this is done by opening the shunt circuit containing the punctured capacitor thereby to break the short circuit produced by the capacitor's failure while with series capacitors they are short circuited by a switch or contactor upon their failure.

Automatically operating equipment for protecting against capacitor dielectric failure is not broadly new. One such arrangement is illustrated and described in my prior Patent No. 1,755,095 which was granted on April 15, 1930. The equipment disclosed in that patent requires an auxiliary source of direct current electrical energy for its operation and is therefore only adapted for application to capacitors which are installed at locations where such a source is available, such as sub-stations or main generating stations. It has been found, however, to be desirable to locate the capacitors at equally spaced intervals which means that many of the installations will be at remote and inaccessible places on a distribution or transmission system and obviously there will be no convenient auxiliary source of current at such places. It is therefore very desirable that the protective equipment should be self-operating from the line or circuit to which the capacitor is attached.

Furthermore, as in the case of many engineering refinements and improvements upon existing apparatus there is an economic conflict between the value of the advantage to be derived from the improvement and the cost of the improvement itself. In the case of the application of electrical condensers or capacitors to electrical distribution or transmission systems it is of vital importance that the cost of each installation as a whole should be a minimum. Consequently, the protective equipment should be as simple and inexpensive as is compatible with its reliability.

In accordance with my invention I divide the usual single capacitor into two parallel connected groups of one or more capacitors respectively, the capacitance of the assembly as a whole being the same as the capacitance of the original single capacitor. If one of the individual capacitors should now fail the ratio of the currents in the parallel branches will be altered because of the change in the relative capacitances of the branches and by suitable apparatus this change in current ratio may be made to produce an operating current for the protective equipment or it may be made to operate an indicating device or signal or all three.

The particular apparatus for producing an operating current comprises a pair of current transformers connected respectively in the parallel capacitor branches and connected to each other so as to be capable of producing a differential current in an operating circuit. Under normal conditions a circulating current flows in the secondary windings of each current transformer and no operating current is produced. However, when a capacitor fails the resulting unbalance in primary winding currents produces a differential current in the secondary windings which may be made to flow in an operating circuit. This differential current may also be made to operate a suitable indicating device which indicates in which parallel branch a capacitor has failed and also how many capacitors have failed.

An object of my invention is to provide a new and improved protective system for electrical apparatus.

A further object of my invention is to provide a new and improved capacitor dielectric failure protective and indicating equipment.

My invention will be better understood from the following description taken in connection with the accompanying drawing and its scope will be pointed out in the appended claims.

Figure 2:
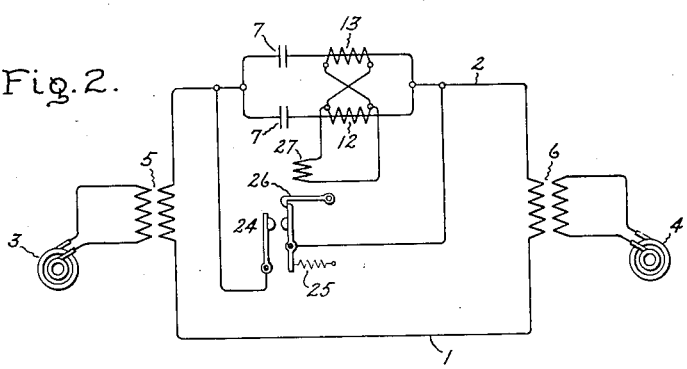

In the drawing, in which like reference characters refer to similar elements in the two figures, Fig. 1 is a diagrammatic illustration of my invention as applied to dielectric failure protective means for parallel capacitors and Fig. 2 shows a similar application of my invention to a series capacitor installation. Fig. 1 also illustrates indicating and signal controlling means associated with the protective equipment.

Referring now to Fig. 1 of the accompanying drawing wherein I have illustrated a conventional high voltage transmission system comprising conductors 1 and 2 which are connected at each end to synchronous machines 3 and 4 through power transformers 5 and 6 respectively. The power flow in this system may be from right to left or left to right as viewed in the drawing, depending upon which of the synchronous machines is made to act as a generator and which as a motor. Connected between conductors 1 and 2 is a parallel capacitor installation comprising two groups of parallel connected capacitors 7. This installation is connected between conductors 1 and 2 through a normally closed switch or contactor 8, which is biased to open position by any suitable means such as a spring 9 and which is restrained from opening by a latch 10 which is under the control of a tripping magnet 11.

A pair of cross connected current transformers 12 and 13 are connected respectively in the circuit of each group of capacitors and the differential current produced by the transformers is connected to operate tripping coil 11.

An indicating and circuit controlling device 14 is provided for indicating how many capacitors have failed and in which branch they are located. This device also controls signals or alarms for indicating failure of one or more capacitors. This device may be of any suitable construction, the one illustrated being an ordinary wattmetric type circuit controlling-indicating instrument having a current coil 15 connected across the current transformers and a potential coil 16 which is energized through a suitable potential transformer 17 connected between conductors 1 and 2. Any other suitable source of constant voltage might be used to energize coil 16 however. Instrument 14 also has an indicating and contact making pointer 18 which cooperates with a suitably calibrated scale 19 and fixed contacts 20 and 21, which are connected respectively to suitable signals, such as lamps 22 and 23.

In practice it will of course be desirable from the point of view of cost of production to have all of the capacitors 7 substantially identical. In this way if current transformers 12 and 13 have the same ratio they will produce no differential operating current under normal conditions. However, my invention is not limited to this particular relationship and any arrangement operating on a differential current in the parallel capacitor branches will fall within my invention in its broader aspects.

The operation of Fig. 1 is as follows. Assume that the transmission circuit comprising conductors 1 and 2 is transmitting power in the usual manner between its terminal apparatus and that capacitors 7 are all in good condition. Under these circumstances the current in each parallel branch of capacitors will obviously be equal. The currents in the secondary windings of current transformers 12 and 13 will therefore also be equal and as they are cross or differentially connected a circulating current will flow in each of these windings and no current will be left to flow in coils 11 and 15.

If now one of the capacitors should fail, as a result of a lightning stroke for example, the relative capacitive reactance of the parallel branches would change and consequently the ratio of the currents in the branches would change. Thus if one of the capacitors in the upper branch should fail the current in this branch would increase because the branch's capacitance would increase and hence its capacitive reactance would decrease. More current would therefore be induced in the secondary winding of current transformer 13 than could flow in the secondary winding of current transformer 12. Consequently this differential current would flow in windings 11 and 15.

The result of this flow of differential current in coil 15 will be to produce a torque in instrument 14 just as in any wattmeter with the result that arm 18 will move a distance proportional to the value of the differential current. As the magnitude of the differential current will be a function of the number of capacitors which have failed in any branch this instrument 14 can be calibrated to read directly the number of capacitors which have failed. Furthermore, it will be obvious that the phase of the differential current with respect to the phase of the current in potential coil 16 will be opposite in sign depending upon in which branch the capacitors fail. Consequently the torque of instrument 14 will be opposite in sign depending upon which branch contains the broken down capacitor or capacitors. In this way instrument 14 will indicate how many capacitors have failed and in which branch they are located.

If enough capacitors fail so that there is danger of a short circuit on the system the arm 18 will engage one or the other of contacts 20 or 21 thereby to complete an energizing circuit for one of the signals or alarms 22 or 23. Tripping coil 11 may be designed to trip open the contactor or switch 8 at any desired value of differential current thereby to take the capacitor installation out of service.

Fig. 2 illustrates a series capacitor installation.

In such an installation the protection equipment is arranged to take a capacitor which has failed out of service by short circuiting it. Consequently a normally open contactor or switch 24 is provided which is strongly biased to closing position by a suitable spring 25 or equivalent element and which is restrained from closing by a latch 26 which is arranged to be tripped by coil 27 which is operated by the differential current produced by transformers 12 and 13.

The operation of the arrangement is similar to the operation of Fig. 1 in that if one or the other of capacitors 7 fail, a differential current will be produced for energizing the tripping coil 27. Although it has not been illustrated it will be obvious to those skilled in the art that the indicating and signalling means of Fig. 1 might also be applied to the arrangement of Fig. 2.

While I have shown and described particular embodiments of my invention it will be obvious to those skilled in the art that changes and modifications may be made without departing from my invention in its broader aspects and I, therefore, aim in the appended claims to cover all such changes and modifications that fall within the true spirit and scope of my invention.

What I claim as new and desire to secure by Letters Patent of the United States, is:

1. In combination, an electric circuit, a plurality of impedance devices which are subject to failure connected in parallel groups in said circuit, a pair of cross connected current transformers connected respectively in each group, and means operative in accordance with a differential current produced by said current transformers as a result of failure of one or more of said impedance devices for indicating in which group the greater number of failures occurred and the preponderance of devices which failed in that group.

2. In combination, an electric circuit, a plurality of electric condensers connected in two parallel groups in said circuit, a pair of cross connected current transformers connected respectively in each of said groups of condensers, and indicating means connected to be responsive to the magnitude and phase of a differential current produced by said current transformers upon failure of one or more of said condensers.

3. In combination, an electric circuit, a plurality of electric condensers connected in two parallel groups in said circuit, a pair of cross connected current transformers connected respectively in each group, a two coil wattmetric indicating device, means connecting one of the coils of said device to be responsive to a differential current produced by said transformers and means connecting the other coil of said device to be responsive to the voltage of said circuit.

THOMAS A. E. BELT.